(12) United States Patent
Ding et al.

(10) Patent No.: US 11,585,719 B2
(45) Date of Patent: Feb. 21, 2023

(54) LEAK DETECTION SYSTEMS AND METHODS OF DETECTING LEAKAGE

(71) Applicant: SAINT-GOBAIN PERFORMANCE PLASTICS CORPORATION, Solon, OH (US)

(72) Inventors: Jian L. Ding, Stow, MA (US); Michael J. Tzivanis, Chicopee, MA (US); Charles S. Golub, Westford, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 5 days.

(21) Appl. No.: 16/731,318

(22) Filed: Dec. 31, 2019

(65) Prior Publication Data

US 2020/0217741 A1 Jul. 9, 2020

Related U.S. Application Data

(60) Provisional application No. 62/786,699, filed on Dec. 31, 2018.

(51) Int. Cl.
*G01M 3/18* (2006.01)
*G01M 3/04* (2006.01)

(52) U.S. Cl.
CPC ............ *G01M 3/183* (2013.01); *G01M 3/045* (2013.01)

(58) Field of Classification Search
CPC .................................................. G01M 3/183
See application file for complete search history.

(56) References Cited

U.S. PATENT DOCUMENTS

| 4,864,847 A | 9/1989 | Anderson et al. |
| 5,325,810 A | 7/1994 | Bannister |

(Continued)

FOREIGN PATENT DOCUMENTS

| CN | 107923815 A | 4/2018 |
| EP | 1628128 B1 | 8/2008 |

(Continued)

OTHER PUBLICATIONS

International Search Report and Written Opinion for PCT/US2019/069043, dated Sep. 4, 2020, 11 pages.

*Primary Examiner* — Paul M. West
*Assistant Examiner* — Mark A Shabman
(74) *Attorney, Agent, or Firm* — Abel Schillinger, LLP; Chi Suk Kim

(57) ABSTRACT

A leak detection system comprising: an adapter configured to be coupled to a conduit and direct leakage from the conduit to a leakage sensor, wherein the adapter comprises a wick comprising: a hydrophilic material, a cationic polymer material, an anionic polymer material, a hydrophilic non-ionic material, or any combination thereof. A leak detection system comprising: a laminate adapted to transport leaked fluid from a conduit to a leakage sensor, wherein the laminate comprises: a wick adapted to transport the leaked fluid; and an adhesive adapted to secure the wick to the conduit. A leak detection system comprising: a wick disposed on a substrate and adapted to transport leaked fluid from a conduit to a leakage sensor, wherein the wick comprises a plurality of fluid channels in a matrix arrangement.

18 Claims, 3 Drawing Sheets

(56) References Cited

U.S. PATENT DOCUMENTS

| | | | |
|---|---|---|---|
| 5,906,876 A * | 5/1999 | Conway | A41B 17/00 |
| | | | 428/95 |
| 5,918,267 A | 6/1999 | Evans et al. | |
| 6,526,807 B1 | 3/2003 | Doumit et al. | |
| 6,826,948 B1 | 12/2004 | Bhatti et al. | |
| 7,956,760 B2 | 6/2011 | Hill | |
| 8,441,362 B2 | 5/2013 | Oguri | |
| 9,245,438 B2 | 1/2016 | Burtner et al. | |
| 9,482,589 B2 | 11/2016 | Ghodrati | |
| 9,797,800 B2 | 10/2017 | Dudar | |
| 2005/0092070 A1 * | 5/2005 | Bhatti | G01M 3/045 |
| | | | 73/40 |
| 2005/0166666 A1 | 8/2005 | Tsukagoshi | |
| 2006/0032761 A1 * | 2/2006 | Oguri | G08B 21/20 |
| | | | 205/788 |
| 2011/0071367 A1 | 3/2011 | Court et al. | |
| 2014/0311905 A1 * | 10/2014 | Stetter | B01J 31/06 |
| | | | 204/424 |
| 2016/0284193 A1 | 9/2016 | Davis et al. | |
| 2017/0003192 A1 | 1/2017 | Ling et al. | |
| 2020/0217741 A1 | 7/2020 | Ding et al. | |

FOREIGN PATENT DOCUMENTS

| | | |
|---|---|---|
| JP | 2002250670 A | 9/2002 |
| JP | 2006133075 A | 5/2006 |
| JP | 2006258684 A | 9/2006 |
| JP | 2007510903 A | 4/2007 |
| JP | 2007269356 A | 10/2007 |
| JP | 2016509182 A | 3/2016 |
| TW | 200533859 A | 10/2005 |
| TW | 201702566 A | 1/2017 |

* cited by examiner

LEAK DETECTION SYSTEMS AND METHODS OF DETECTING LEAKAGE

CROSS-REFERENCE TO RELATED APPLICATION(S)

This application claims priority under 35 U.S.C. § 119(e) to U.S. patent application Ser. No. 62/786,699 entitled "LEAK DETECTION SYSTEMS AND METHODS OF DETECTING LEAKAGE," by Jian L. DING et al., filed Dec. 31, 2018, which is assigned to the current assignee hereof and incorporated herein by reference in its entirety.

FIELD OF THE DISCLOSURE

The present disclosure relates to leak detection systems and methods of detecting leakage.

RELATED ART

Many commercial and residential processes require transport of fluids between multiple conduits. Long transport lengths often require serial connection of fluid conduits, such as pipes, joined together. While every effort is often made to maintain joint integrity to prevent leakage, it is not uncommon for leakage to occur—particularly in harsh environments or when using certain chemicals or joint types.

Industries requiring fluid transport continue to demand improved systems and methods of detecting leakage.

BRIEF DESCRIPTION OF THE DRAWINGS

Embodiments are illustrated by way of example and are not intended to be limited in the accompanying figures.

DETAILED DESCRIPTION

Figure 1:
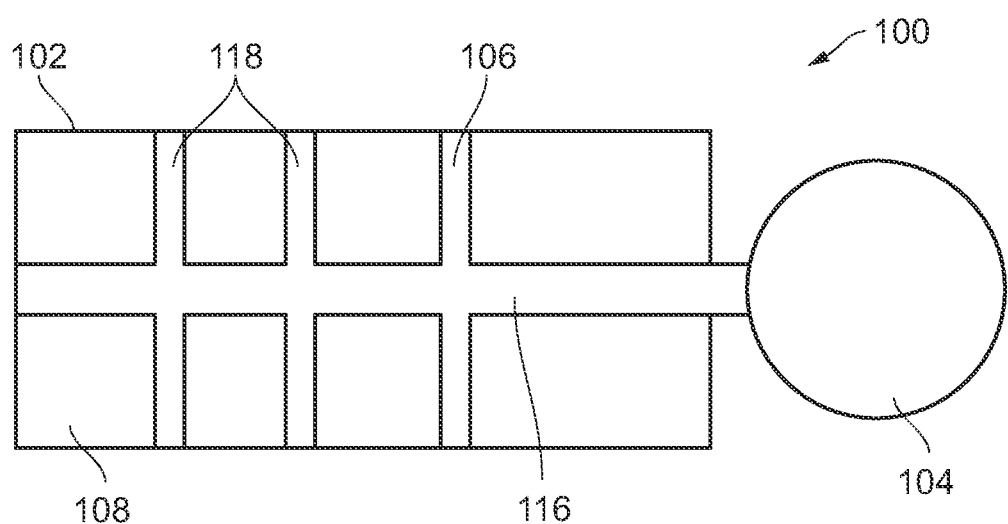
FIG. 1 includes a top view of a leak detection system in accordance with an embodiment.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The terms "generally," "substantially," "approximately," and the like are intended to cover a range of deviations from the given value. In a particular embodiment, the terms "generally," "substantially," "approximately," and the like refer to deviations in either direction of the value within 10% of the value, within 9% of the value, within 8% of the value, within 7% of the value, within 6% of the value, within 5% of the value, within 4% of the value, within 3% of the value, within 2% of the value, or within 1% of the value.

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the fluid transport and leakage detection arts.

In accordance with a particular aspect, a leakage detection system can generally include an adapter configured to be coupled to a conduit and direct leakage from the conduit to a leakage sensor. In an embodiment, the adapter can include a hydrophilic cationic polymer. In another embodiment, the adapter can include a natural substance consisting of at least one of silica, collagen, pectin, gelatin, starch, guar gum, gum Arabic, locust bean gum, gum karaya, alginic acid, sodium or potassium salt. In yet another embodiment, the adapter can include a synthetic substance consisting of at least one of sodium carboxymethylcellulose (CMC), crosslinked sodium carboxymethylcellulose, crystalline sodium carboxymethyl cellulose, polyvinyl alcohol, polyvinyl pyrollidone, polyethylene glycol, polypropylene glycol, crosslinked dextran, starch-acrylonitrile graft copolymer, starch sodium polyacrylate, gluten, polymer of methyl vinyl ether, maleic acid, metal or ammonium salts of polyacrylic acid or its copolymers, metal or ammonium salts of polystyrene sulfonic acid. In yet a further embodiment, the adapter can include any combination of a hydrophilic cationic polymer, a natural substance, and a synthetic substance.

In an embodiment, the adapter can include a laminate structure adapted to transport the leakage. The laminate structure can include a wick adapted to transport the leakage and an engagement element, such as an adhesive, adapted to secure the wick to the conduit. In a particular instance, the wick can be disposed on the engagement element in a matrix arrangement.

In another aspect of the invention, a microelectronics facility can include an operating area for performing an operational step associated with formation of a microelectronics component. A fluid conduit can be in communication with the operational area. The fluid conduit can be adapted to transport a fluid associated with the operational step. The fluid conduit can include a vertical junction between an upper conduit and a lower conduit. A removable leak detection system can be disposed around the lower conduit. The leak detection system can include a wick extending around, or adapted to extend around, the lower conduit. A sensor can be adapted to detect leakage transported from the lower conduit along the wick.

In another aspect of the invention, a method of detecting leakage can include wrapping a wick around at least a portion of an entire circumference of a vertically oriented fluid conduit. The wick can be adhered to the fluid conduit by an adhesive associated with the wick. A leak detection sensor can be attached to the wick to detect leakage from the fluid conduit.

In an embodiment, the leak detection system may be disposed adjacent to a fluid interface on a fluid conduit. According to certain embodiments, the fluid conduit may include a junction whereby fluid may leak from the fluid interface such as, for example, a pipe junction, a pipe coupling, a pipe, a pipe bend, a manifold, an elbow, a valve, a pump, a regulator, a seam or weld line, a nozzle or sprayer, a threaded port, a sampling valve, an exhaust line, a fluid inlet or outlet, or any other similar junction.

According to certain embodiments, leak detection systems as described herein may be positioned to monitor leakage on fluid component spanning several different technical specialties. For example, a leak detection system in accordance with one or more embodiments described herein may be utilized in electronic device fabrication such as in the semiconductor and superconductor industry; medical devices such as fluid transport lines and pumps; pipe couplings such as those found in the oil and gas industry, potable water and sewer systems; aerospace industry in fabrication, maintenance, and design; food and beverage industry; and in the automotive industry. In specific embodiments, the leak detection system may be attached to a fluid component housing a semiconductor fluid which may include at least one of HF, $H_2SO_4$, $HNO_3$, NaClO, $H_2O_2$, $H_3PO_4$, CMP, HCL, deionized water, ethanol, ethanol IPA, acetone, a hydrocarbon solvent, toluene, or may be another semiconductor fluid. According to yet other embodiments, leak detection systems described herein may reduce response time to leaks by quickly and accurately detecting small fluid leakages, allowing an operator to address a possible leak before it has an opportunity to grow larger.

In accordance with an embodiment, the sensor may be adapted to perceive a particular fluid leakage. For example, the sensor may be adapted to perceive a fluid leakage of about 0.0001 mL to about 1 mL. In a number of embodiments, the sensor may be adapted to perceive a fluid leakage of at least about 0.0001 mL, such as, at least 0.001 mL, or at least 0.01 mL, or at least 0.05 mL, or at least 0.1 mL.

FIG. 1 includes a top view of a leak detection system 100 in accordance with an embodiment. The leak detection system 100 can generally include an adapter 102 configured to be coupled to a conduit and direct leakage from the conduit to a leakage sensor 104.

In an embodiment, the adapter 102 can include a composite defined by a wick 106 and an adhesive 108. In a particular embodiment, the wick 106 can be coupled to the adhesive 108. In a more particular embodiment, the wick 106 can be directly coupled to the adhesive 108. In another more particular embodiment, the wick 106 and adhesive 108 can be coupled together by an intermediary layer or material. For example, a substrate can be disposed between the wick 106 and adhesive 108.

In certain embodiments, the wick 106 and adhesive 108 can be fixedly coupled together. In other embodiments, the wick 106 and adhesive 108 can be removably coupled together.

In an embodiment, the adapter 102 can be flexible. In a more particular embodiment, at least one of the wick 106 and adhesive 108 can include a flexible material. Exemplary materials for the wick 106 include hydrophilic materials, cationic polymers, anionic polymers, hydrophilic non-ionic materials, and combinations thereof. In a particular embodiment, an exemplary natural substance can include silica, collagen, pectin, gelatin, starch, guar gum, gum Arabic, locust bean gum, gum karaya, alginic acid, sodium or potassium salt. In another particular embodiment, an exemplary synthetic substance can include sodium carboxymethylcellulose (CMC), crosslinked sodium carboxymethylcellulose, crystalline sodium carboxymethyl cellulose, polyvinyl alcohol, polyvinyl pyrollidone, polyethylene glycol, polypropylene glycol, cross-linked dextran, starch-acrylonitrile graft copolymer, starch sodium polyacrylate, gluten, polymer of methyl vinyl ether, maleic acid, metal or ammonium salts of polyacrylic acid or its copolymers, metal or ammonium salts of polystyrene sulfonic acid. In a particular embodiment, the wick 106 can include a combination of natural substances, a combination of synthetic substances, or a combination of natural substances and synthetic substances.

The adhesive 108 can include, for example, an epoxy, a polyurethane, a polyimide, or any combination thereof. In an embodiment, the adhesive 108 comprises a film or tape adapted to be coupled with the wick 106. In another embodiment, the adhesive 108 can include a paste, liquid, or other liquid or semi-liquid medium that can be applied to the wick 106. In certain instances, the adhesive 108 can include a hot melt, a thermoset, a pressure sensitive adhesive, or a contact adhesive. The adhesive 108 can be structural, semi-structural, or non-structural.

The adhesive 108 can be adapted to secure the wick 106 to a conduit. In a particular instance, the adhesive 108 can be adapted to removably secure the wick 106 to the conduit. For instance, in accordance with a particular embodiment the adaptor 102 can be configured for multiple uses. That is, for example, the adaptor 102 can be removed from a first conduit and installed relative to a second conduit.

Figure 2:
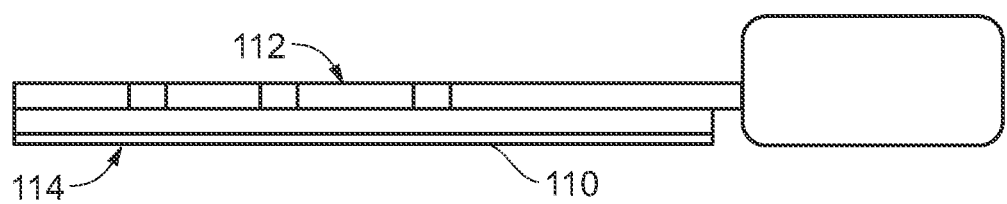
FIG. 2 includes a side view of the leak detection system in accordance with an embodiment.

In an embodiment, the leak detection system 100 can include a removable backing 110 (FIG. 2) adapted to at least partially protect the adhesive 108 from unwanted adhesion prior to installation. The backing 110 can include a film, tape, or sheet removably coupled with the adhesive 108. Prior to installing the leak detection system 100, the backing 100 can be peeled from the leak detection system 100 to expose the adhesive 108 for installation.

In an embodiment, the leak detection system 100 can include a discrete component adapted to engage with a fluid conduit to detect fluid leakage therefrom. The leak detection system 100 can be sized, shaped, or otherwise configured in a ready-to-use configuration. For example, the leak detection system 100 can be preformed to a usable shape and size. In another embodiment, the leak detection system 100 can be selectively created by an operator or installation technician from a leak detection preform (e.g., a sheet or a roll) to fit a particular fluid conduit. In such a manner, the operator or technician can shape or size the leak detection system 100 as desired.

By way of non-limiting example, the leak detection preform can include a strip or roll of material including the wick 106 and the adhesive 108. The leak detection preform can have a length, $L_P$, as defined by a largest dimension of the leak detection preform, greater than a length, $L_{LDS}$, of the leak detection system 100 to be used for leak detection on a conduit. In a particular instance, $L_P$ can be at least 1.01 $L_{LDS}$, at least 1.05 $L_{LDS}$, at least 1.1 $L_{LDS}$, at least 1.2 $L_{LDS}$, at least 1.4 $L_{LDS}$, at least 1.6 $L_{LDS}$, at least 1.8 $L_{LDS}$, or at least 2.0 $L_{LDS}$. In certain instances, $L_P$ can be at least 3 $L_{LDS}$, at least 4 $L_{LDS}$, at least 5 $L_{LDS}$, or at least 10 $L_{LDS}$. In an embodiment, $L_P$ can be no greater than 10,000 $L_{LDS}$, no greater than 5,000 $L_{LDS}$, no greater than 1,000 $L_{LDS}$, or no greater than 100 $L_{LDS}$. The length, $L_P$, of the leak detection preform, can be reduced as the operator removes portions of the leak detection preform to create usable, discrete leak detection systems 100.

The conduit adapted to receive the wick can define a circumference, $C_C$. In certain embodiments, the wick 106 can have a length within a range of 1.0 $C_C$ and 5.0 $C_C$, 1.0 $C_C$ and 4.0 $C_C$, 1.0 $C_C$ and 3.0 $C_C$, or 1.0 $C_C$ and 2.0 $C_C$.

In a particular embodiment, the wick 106 can be single ply, as viewed in the installed state. As used herein, single ply can refer to a single layer of material, as viewed in the final state. That is, for instance, a single ply wick does not, or substantially does not, overlap itself so as to create a multi-ply construction.

In an embodiment, the leak detection preform can include a weakened structure such as a plurality of perforations, indicia, or other elements adapted to indicate to the operator or assist the operator in removing discrete leak detection systems 100 from the leak detection preform. After removing a discrete leak detection system 100 from the leak detection preform, an adjacent area of the leak detection preform can become exposed for creating an additional leak detection system 100. The operator can then form an additional leak detection system 100 for another suitable placement.

In an embodiment, the leak detection system 100 comprises a laminate structure defining a first major surface 112 and a second major surface 114 spaced apart from one another by a thickness of the laminate. In a particular embodiment, the thickness of the laminate can be less than 25 mm, less than 20 mm, less than 15 mm, less than 10 mm, or less than 5 mm. In another particular embodiment, the thickness of the laminate can be no less than 0.1 mm, no less than 0.5 mm, no less than 1 mm, or no less than 2 mm. In an embodiment, the second major surface 114 can be at least partially defined by the adhesive 108. In a more particular embodiment, the second major surface 114 can be entirely defined by the adhesive 108. In another embodiment, the first major surface 112 is at least partially defined by the adhesive 108, at least partially defined by the wick 106, or both. In an embodiment, at least 5% of the first major surface 112 is defined by the wick 106, at least 10% of the first major surface 112 is defined by the wick 106, at least 15% of the first major surface 112 is defined by the wick 106, at least 20% of the first major surface 112 is defined by the wick 106, at least 25% of the first major surface 112 is defined by the wick 106, at least 30% of the first major surface 112 is defined by the wick 106, at least 35% of the first major surface 112 is defined by the wick 106, at least 40% of the first major surface 112 is defined by the wick 106, or at least 45% of the first major surface 112 is defined by the wick 106. In another embodiment, no greater than 99% of the first major surface 112 is defined by the wick 106, no greater than 95% of the first major surface 112 is defined by the wick 106, no greater than 90% of the first major surface 112 is defined by the wick 106, no greater than 80% of the first major surface 112 is defined by the wick 106, no greater than 70% of the first major surface 112 is defined by the wick 106, no greater than 60% of the first major surface 112 is defined by the wick 106, or no greater than 50% of the first major surface 112 is defined by the wick 106.

In an embodiment, the laminate can define a uniform, or generally uniform, thickness as measured at all locations along the laminate. In another embodiment, the laminate can define a first thickness at a first location of the laminate and a second thickness at a second location of the laminate, wherein the first and second thicknesses are different from one another. For instance, in an embodiment, the laminate can define a first thickness at locations including the wick 106 and adhesive 108 and a second thickness at locations including only one of the wick 106 and adhesive 108. The first and second thicknesses can be different from one another. For instance, the first location can be thicker than the second location. In an embodiment, the first location can have a thickness at least 101% the thickness at the second location, at least 105% the thickness at the second location, at least 110% the thickness at the second location, at least 125% the thickness at the second location, at least 150% the thickness at the second location, or at least 175% the thickness at the second location. In another embodiment, the first location can have a thickness no greater than 10,000% the thickness at the second location, no greater than 5,000% the thickness at the second location, no greater than 1,000% the thickness at the second location, no greater than 500% the thickness at the second location, or no greater than 200% the thickness at the second location.

Referring to FIG. 1, in accordance with an embodiment, the wick 106 can define a matrix arrangement, as viewed from the first major surface 112. The matrix arrangement can include, for example, a grid-like structure of wicking materials. In an embodiment, the matrix arrangement can be formed from a single wicking material. In another embodiment, the matrix arrangement can be formed from different wicking materials coupled together. For instance, the matrix arrangement can include a plurality of rows formed from a first material and a plurality of columns formed form a second material different than the first material. In such a manner, leakage can be directed per the specific arrangement of intended use.

In certain instances, the matrix can include a unitary construction. For example, the matrix can be formed as a single component coupled. In other instances, the matrix can include a plurality of components coupled together. For example, the matrix can include one or more primary fluid channels 116 and one or more secondary channels 118. In the illustrated embodiment, the matrix includes a centrally located primary fluid channel 116 and a plurality of secondary channels 118 branching off therefrom. In an embodiment, the secondary channels 118 can extend to the edge 120 of the laminate structure. Leakage can thus be transported from the conduit through the secondary channels 118 to the primary fluid channel 116 and to the sensor 104.

In an embodiment, the fluid channels 116 and 118 can have similar sizes, shapes, materials, or fluid characteristics as compared to one another. In another embodiment, the primary fluid channels 116 can have at least one of a different size as compared to the secondary channels 118, a different shape as compared to the secondary channels 118, a different material as compared to the secondary channels 118, and a different fluid characteristic as compared to the secondary channels 118.

In an embodiment, the sensor 104 can be in fluid communication with at least one of the fluid channels 116 and 118. In a particular embodiment, the sensor 104 can be in fluid communication with the primary fluid channel 116.

In accordance with an embodiment, the sensor 104 can be adapted to sense a particular fluid leakage. For example, the sensor 104 can be adapted to perceive a volume of fluid leakage in a range of 0.0001 mL and 1 mL. In a number of embodiments, the leak detection system 100 can include a salt puck (not illustrated) adapted to dissolve components of the fluid for better monitoring through the sensor 104.

Figure 3:
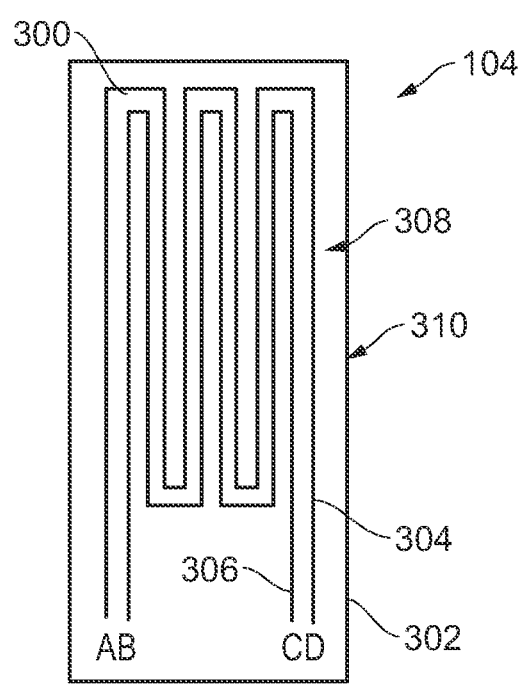
FIG. 3 includes a top view of a sensor for a leak detection system in accordance with an embodiment.
Figure 4:
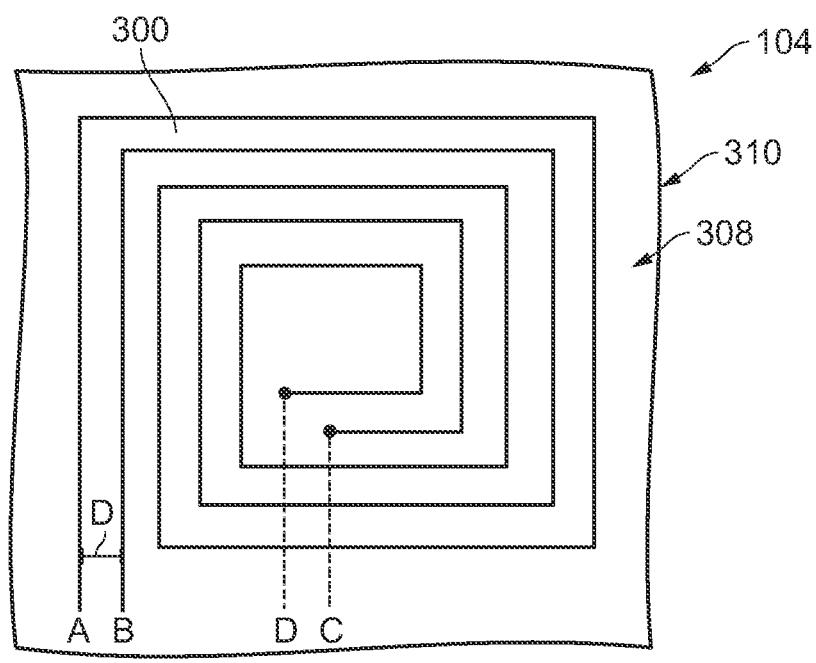
FIG. 4 includes a top view of a sensor for a leak detection system in accordance with another embodiment.

In a particular embodiment, as shown in FIGS. 3 and 4, the sensor 104 can include an electrical circuit 300 disposed on a substrate 302. In an embodiment, the electrical circuit 300 can form a geometric parallel comb circuit design. As illustrated in FIG. 3, in an embodiment the electrical circuit 300 can form a geometric serpentine design between a first wire 304 (extending between A and D) and second wire 306 (extending between B and C). FIG. 4 illustrates a schematic view of another sensor 104 having an electrical circuit 300 in accordance with another embodiment. As illustrated in FIG. 4, the electrical circuit can form a geometric spiral design between a first wire 304 (extends between A and D) and a second wire 306 (extending between B and C). The sensor 104 can permit serial or parallel measurements of a measured property of the electrical circuit 300. The measured property can undergo a change in response to fluid contact that the sensor 104 monitors or responds to via a communication device. The measured property may be at least one of resistance, impedance, capacitance, current, voltage, or another measured property of the sensor 104. In a number of embodiments, the sensor 104 can include two electrical circuits 300 electrically connected in parallel. In a number of embodiments, the sensor 104 can include two electrical circuits 300 electrically connected in series.

In an embodiment, in a first state, the electrical circuit 300 of the sensor 104 can have a first condition when dry and a second condition when wet. In a second state, the sensor 104 can be adapted to monitor the operability of the sensor 104, i.e., monitor the ability of the sensor 104 to detect leaks in the first state. In a number of embodiments, operation of the sensor 104 to execute these two operations is as follows: 1) measure the measured property between A and D to ensure acceptable operability of the circuit; 2) measure the measured property between B and C to ensure acceptable operability of the circuit; and 3) measure the measured property between A and B with C and D open to detect the first state (i.e. whether the sensor 104 is in a first condition when dry and a second condition when wet) of the circuit. The order of these steps can be varied and may be done on a continuous basis. Alternatively, the operation of the sensor 104 and leak detection system 100 to execute these two operations is as follows: 1) short points C and D to ensure acceptable operability of the circuit; and 3) measure the measured property between A and B with C and D open to detect the first state (i.e. whether the sensor 104 is in a first condition when dry and a second condition when wet) of the circuit. As such, a method of using a leak detection system 100 may include: 1) providing at least one leak detection system 100 having a sensor 104 having a first state having a first condition when dry and a second condition when wet, and a second state adapted to monitor the operability of the sensor 104, a communication device operatively connected to the sensor 104, and an attachment element such as adhesive 108 adapted to attach the leak detection system 100 to a fluid conduit having a fluid for monitoring fluid leakage; and 2) attaching the leak detection system 100 to the fluid conduit for monitoring fluid leakage.

It is contemplated in other embodiments, that the sensor 104 can include a substrate 302 adapted to produce luminescence, fluorescence, incandescence, a change in temperature, a change in pressure as a result of contacting fluid, or any other suitable changing characteristic in response to contacting fluid. A detection element can be selected accordingly to detect the changing condition of the substrate 302. For example, the detection element can include an optical sensor, a thermocouple, or a pressure transducer. As the substrate 302 changes in condition (luminescence, fluorescence, incandescence, temperature, or pressure) as a result of contacting fluid, the detection element can sense the changed condition and generate a signal to the communication device 104 in order to generate an alert of a leakage.

Figure 5:
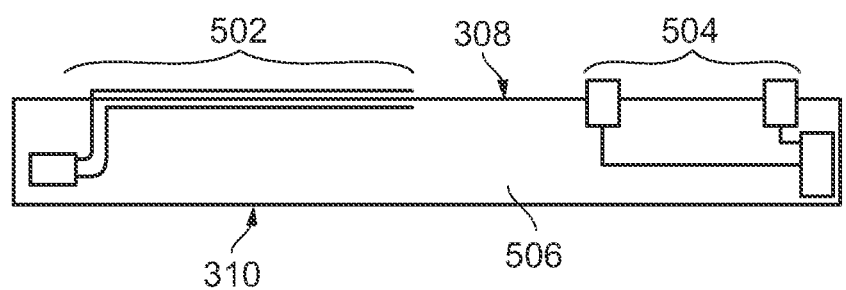
FIG. 5 includes a cross-sectional view of a sensor for a leak detection system in accordance with an embodiment.

FIG. 5 illustrates a cross-sectional elevation view of an exemplary sensor 104 having two detection elements in accordance with an embodiment. The sensor 104 can include at least two detection elements 502 and 504 disposed on one or more substrates 506. In a particular embodiment, the detection elements 502 and 504 can be disposed on a same substrate 506. In another particular embodiment, the detection elements 502 and 504 can be disposed on adjoining substrates (collectively referred to as "the substrate"). The detection elements 502 and 504 can be disposed on the same or different major surfaces 308 or 310 of the substrate 506. As illustrated, and in accordance with another embodiment, the detection elements 502 and 504 can also be at least partially embedded within the substrate 506.

In an embodiment, the detection elements 502 and 504 can be different from one another. That is, each of the at least two detection elements 502 and 504 can be adapted to detect a different condition of the substrate 506. In a particular embodiment, the detection elements 502 and 504 can be spaced apart on the substrate 506. This may facilitate easier assembly of the sensor 104 and permit easier removal of broken or unsuitable detection elements. In another embodiment, the detection elements 502 and 504 can overlap vertically or horizontally. Vertical or horizontal overlap may reduce the size of the sensor 104, thus reducing the space necessary to install the sensor 104.

Any of the detection elements described above may further include an electronic component, such as: a resistor, a capacitor, an inductor, a transistor, another similar component, or any combination thereof. Such electronic components may be necessary to develop complete circuits for the detection elements described above.

In an embodiment, a communication device (not illustrated) may be operatively coupled to the sensor 104. In a particular embodiment, the communication device may be wirelessly connected to the sensor 104. This wireless communication may occur, for example, by Bluetooth or by another short range wireless protocol. In another particular embodiment, the communication device may be connected to the sensor 104 by a conductive wire. Care should be taken to ensure the conductive wire is not sensitive to the fluid being monitored. That is, the conductive wire should not be constructed from a material that will be destroyed upon fluid contact. Alternatively, the conductive wire may be insulated or otherwise protected against damaging fluid interaction by an outer layer or shield layer disposed between the wire and the suspected channel for fluid travel in the leak detection system 100. In a further embodiment, the communication device may be integral to the sensor 104.

In an embodiment, the communication device may be coupled to the substrate 106. In another embodiment, the communication device may be coupled to the sensor 104.

The communication device may be a wireless or wired communication device. That is, the communication device may operate using a wireless protocol, such as an HTML or HTMLS; a local area network (LAN); or a wired protocol such as a conductive wire. The communication device may be adapted to receive an incoming signal from the sensor 104 and send an outgoing signal to a communication hub or receiving device when the sensor 104 senses a fluid leakage. In this way the communication device may be operatively connected to a communication hub to compile and analyze information from the sensor 104 and give feedback to a user or the sensor 104 itself based on a first state (first condition or a second condition) or second state of the sensor 104 as explained herein.

Computer program code for carrying out operations for aspects of the invention (such as one or more embodiments of the sensor 104 or communication device) may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In an embodiment, the communication device may continuously operate. As used herein, "continuously operate" refers to continuous, or uninterrupted, transmission of a signal from the communication device to, for example, a communication hub. In an embodiment, the communication device can passively operate. As used herein, "passively operate" refers to transmission of a signal, for example, to a communication hub, only upon occurrence of a threshold condition—i.e., a fluid leak. For example, the communication device may be powered by a power source. In an embodiment, only when the sensor 104 senses a leakage might the communication device receive power so as to transmit the signal to the communication hub. This may increase operable lifetime of the leak detection system 100 by reducing current draw from the power source, thus allowing for more remote positioning of the leak detection system 100.

In an embodiment the communication device may be exposed such that it extends beyond an outer surface of the substrate. Thus, the communication device may be accessible such that a user can adjust or replace the communication device. In an embodiment, the communication device may be at least partially, such as fully, embedded within the substrate. This may protect the communication device from exposure to harmful fluids which may otherwise contact the communication device if disposed on the surface of the substrate.

In an embodiment, the communication device may be removable from the substrate 106. In another embodiment, the communication device may be replaceable. An electrical interface may permit rapid replacement of the communication device. For example, the electrical interface may consist of one or more ports having electrical connection points which match electrical connection points on the communication device. The various communication devices may have the same arrangement of electrical connection points, thereby enabling rapid replacement and interchanging therebetween.

Figure 6:
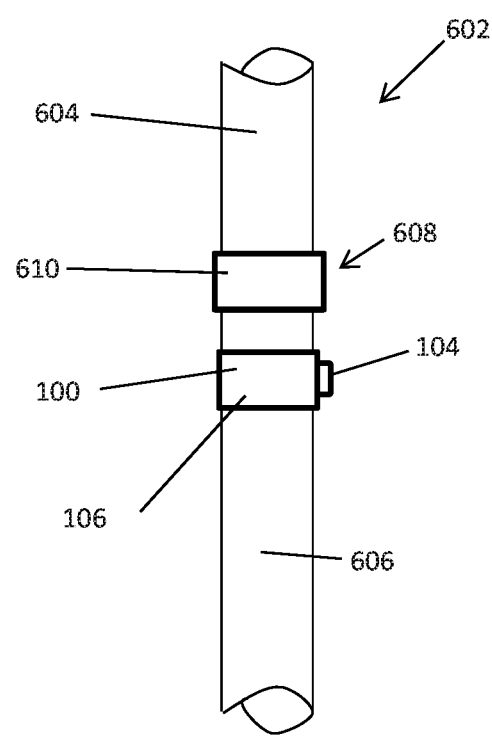
FIG. 6 includes an elevation view of a leak detection system coupled with a conduit in accordance with an embodiment.

Referring to FIG. 6, the leak detection system 100 can be installed on a fluid conduit 602. The fluid conduit 602 illustrated in FIG. 6, includes an upper fluid conduit 604 and a lower fluid conduit 606 joined together at a junction 608. The junction 608 can be formed, for example, by an interface between the upper and lower fluid conduits 604 and 606. In a particular embodiment, the junction 608 can further include a threaded or non-threaded coupling member 610 adapted to secure the upper fluid conduit 604 and lower fluid conduit 606 together. A leak detection system 100 described in accordance with an embodiment can be coupled to the fluid conduit 602, such as at the lower fluid conduit 604, the junction 608, the coupling member 610, or any combination thereof. In another embodiment, the leak detection system 100 can be coupled with the upper fluid conduit 604. In a more particular embodiment, the leak detection system 100 can be coupled with the upper fluid conduit 604 and one or more of the lower fluid conduit 604, the junction 608, and the coupling member 610.

As illustrated in FIG. 6, in an embodiment the leak detection system 100 can be visible from an external environment (e.g., an area where an operator may view the leak detection system 100). In a more particular embodiment, the wick 106 can be visible from an external environment. In yet a more particular embodiment, a majority of the wick 106 can be visible from an external environment.

In certain instances, the fluid conduit 602 can be part of a processing facility and associated with an operational step relating to the formation of a component. In a more particular instance, the fluid conduit 602 can be part of a microelectronics facility including an operating area for performing an operational step associated with formation of a microelectronics component. The fluid conduit 604 can be in communication with the operational area and adapted to transport fluid associated with the operational step. In a particular embodiment, the junction 608 can include a vertical junction where traditional leak detection systems often fail.

In an embodiment, the leak detection system 100 can be removable from the fluid conduit 602. In a more particular embodiment, the leak detection system 100 can be reattachable with respect to the fluid conduit 602 or another fluid conduit after removal from the fluid conduit 602. That is, for example, the leak detection system 100 can be reusable.

Attachment of the leak detection system 100 to the fluid conduit 602 can be performed by wrapping and pressing the leak detection system 100 around and into the fluid conduit 602. In an embodiment, wrapping the wick 106 can be performed from a first end of the wick in a direction to a second end of the wick 106 (e.g., around the fluid conduit 602). In an embodiment, pressing the leak detection system 100 into the fluid conduit 602 can include pressing the adhesive 108 into the fluid conduit 602. In certain instances, adhering the wick 106 to the fluid conduit 602 can be performed simultaneously with, or generally simultaneously with, wrapping the wick 106 around the entire circumference, or substantially entire circumference, of the fluid conduit 602.

In an embodiment, attaching the sensor 104 to the wick 106 can be performed after wrapping the wick 106 around substantially the entire circumference of the fluid conduit 602. The sensor 104 can remain spaced apart from the fluid conduit 602 after attachment is complete.

Embodiment 1

A leak detection system comprising:
an adapter configured to be coupled to a conduit and direct leakage from the conduit to a leakage sensor, wherein the adapter comprises a wick comprising:
a hydrophilic material,
a cationic polymer material,
an anionic polymer material,
a hydrophilic non-ionic material, or
any combination thereof.

Embodiment 2

A leak detection system comprising:
a laminate adapted to transport leaked fluid from a conduit to a leakage sensor, wherein the laminate comprises:
a wick adapted to transport the leaked fluid; and
an adhesive adapted to secure the wick to the conduit.

Embodiment 3

A leak detection system comprising:
a wick having a width and adapted to be coupled circumferentially around a conduit in a manner such that the coupled wick has a width no greater than the width of the wick, wherein the wick is adapted to transport leaked fluid to a sensor in any direction relative to the conduit.

Embodiment 4

A leak detection system comprising:
a wick disposed on a substrate and adapted to transport leaked fluid from a conduit to a leakage sensor, wherein the wick comprises a plurality of fluid channels in a matrix arrangement.

Embodiment 5

The leak detection system of any one of the preceding embodiments, wherein the wick is visible from an external environment along an entire circumference of the conduit.

Embodiment 6

The leak detection system of any one of the preceding embodiments, wherein the wick is coupled to adhesive adapted to secure the wick to the conduit.

Embodiment 7

The leak detection system of embodiment 6, wherein the wick and adhesive are fixedly coupled together.

Embodiment 8

The leak detection system of any one of the preceding embodiments, wherein the wick comprises a flexible material.

Embodiment 9

The leak detection system of any one of the preceding embodiments, wherein the conduit comprises a vertically oriented pipe.

Embodiment 10

The leak detection system of embodiment 9, wherein the vertically oriented pipe is joined to a secondary pipe at a junction, and wherein the junction is disposed above an area adapted to receive the wick.

Embodiment 11

The leak detection system of any one of the preceding embodiments, wherein the wick comprises:
a hydrophilic cationic polymer,
a natural substance consisting of silica, collagen, pectin, gelatin, starch, guar gum, gum Arabic, locust bean gum, gum karaya, alginic acid, sodium or potassium salt,
a synthetic substance consisting of sodium carboxymethylcellulose (CMC), crosslinked sodium carboxymethylcellulose, crystalline sodium carboxymethyl cellulose, polyvinyl alcohol, polyvinyl pyrollidone, polyethylene glycol, polypropylene glycol, crosslinked dextran, starch-acrylonitrile graft copolymer, starch sodium polyacrylate, gluten, polymer of methyl vinyl ether, maleic acid, metal or ammonium salts of polyacrylic acid or its copolymers, metal or ammonium salts of polystyrene sulfonic acid, or
any combination thereof.

Embodiment 12

The leak detection system of any one of the preceding embodiments, wherein the conduit adapted to receive the wick has a circumference, $C_C$, and wherein a length of the wick is within a range of 1.0 $C_C$ and 5.0 $C_C$, 1.0 $C_C$ and 4.0 $C_C$, 1.0 $C_C$ and 3.0 $C_C$, or 1.0 $C_C$ and 2.0 $C_C$.

Embodiment 13

The leak detection system of any one of the preceding embodiments, wherein, in an installed state with the conduit, the wick is single ply.

Embodiment 14

The leak detection system of any one of the preceding embodiments, wherein the wick is adapted to be coupled with a sensor adapted to detect leaked fluid from the conduit.

Embodiment 15

The leak detection system of embodiment 14, wherein the sensor is adapted to be supported by the wick.

Embodiment 16

The leak detection system of any one of embodiments 14 and 15, wherein the sensor is adapted to be spaced apart from the conduit.

Embodiment 17

The leak detection system of any one of the preceding embodiments, wherein the leak detection system is adapted to be coupled to a conduit associated with an operational step of forming a microelectronic component.

Embodiment 18

The leak detection system of any one of the preceding embodiments, wherein the wick and adhesive comprise a laminate defining first and second major surfaces spaced apart from one another by a thickness of the laminate.

Embodiment 19

The leak detection system of embodiment 18, wherein the second major surface is defined by the adhesive.

Embodiment 20

The leak detection system of any one of embodiments 18 and 19, wherein the first major surface is at least partially defined by the adhesive, at least partially defined by the wick, or both.

Embodiment 21

The leak detection system of any one of embodiments 18-20, wherein at least 5% of the first major surface is defined by the wick, at least 10% of the first major surface is defined by the wick, at least 15% of the first major surface is defined by the wick, at least 20% of the first major surface is defined by the wick, at least 25% of the first major surface is defined by the wick, at least 30% of the first major surface is defined by the wick, at least 35% of the first major surface is defined by the wick, at least 40% of the first major surface is defined by the wick, or at least 45% of the first major surface is defined by the wick.

Embodiment 22

The leak detection system of any one of embodiments 18-21, wherein no greater than 99% of the first major surface is defined by the wick, no greater than 95% of the first major surface is defined by the wick, no greater than 90% of the first major surface is defined by the wick, no greater than 80% of the first major surface is defined by the wick, no greater than 70% of the first major surface is defined by the wick, no greater than 60% of the first major surface is defined by the wick, or no greater than 50% of the first major surface is defined by the wick.

Embodiment 23

The leak detection system of any one of embodiments 18-22, wherein the wick and adhesive are both visible when viewed normal to the first major surface.

Embodiment 24

The leak detection system of any one of embodiments 18-23, wherein the wick comprises a strip coupled with the adhesive.

Embodiment 25

The leak detection system of any one of embodiments 18-23, wherein the wick comprises a coating.

Embodiment 26

The leak detection system of any one of the preceding embodiments, wherein the wick defines a plurality of discrete fluid channels.

Embodiment 27

The leak detection system of embodiment 26, wherein the plurality of discrete fluid channels are in fluid communication.

Embodiment 28

The leak detection system of any one of embodiments 26 and 27, wherein the plurality of discrete fluid channels define a matrix.

Embodiment 29

A fluid conduit comprising:
a junction between a first conduit and a second conduit; wherein at least one of the first and second conduits is a vertical conduit; and
a leak detection system comprising:
  a wick coupled to at least one of the first and second conduits by adhesive; and
  a sensor adapted to detect leakage transported from the junction along the wick.

Embodiment 30

The fluid conduit of embodiment 29, wherein the wick is adapted to be removed from the at least one of the first and second conduits.

Embodiment 31

The fluid conduit of any one of embodiments 29 and 30, wherein the wick is visible from an external environment along the entire circumference of the at least one of the first and second conduits.

Embodiment 32

The fluid conduit of any one of embodiments 29-31, wherein the adhesive is integral with the wick.

Embodiment 33

The fluid conduit of any one of embodiments 29-32, wherein at least one of the first and second conduits are vertically oriented.

Embodiment 34

The fluid conduit of any one of embodiments 29-33, wherein the wick comprises a flexible material.

Embodiment 35

The fluid conduit of any one of embodiments 29-34, wherein the wick is single ply.

Embodiment 36

The fluid conduit of any one of embodiments 29-35, wherein the wick is in direct fluid communication with an ambient environment of an area containing the fluid conduit.

Embodiment 37

The fluid conduit of any one of embodiments 29-36, wherein the first and second conduits are adapted to transport fluid corresponding with an operational step of forming a microelectronics component.

Embodiment 38

The fluid conduit of any one of embodiments 29-37, wherein the sensor is removably coupled to the wick.

Embodiment 39

A microelectronics facility comprising:
an operating area for performing an operational step associated with formation of a microelectronic component;
a fluid conduit in communication with the operational area and adapted to transport a fluid associated with the operational step, the fluid conduit comprising a vertical junction between an upper conduit and a lower conduit; and
a removable leak detection system disposed around the lower conduit, wherein the leak detection system comprises:
a wick extending around an entire circumference of the lower conduit; and
a sensor adapted to detect leakage transported from the lower conduit along the wick.

Embodiment 40

The microelectronics facility of embodiment 39, wherein the fluid associated with the operational step comprises at least one of sulfuric acid, peroxide, hydrogen chloride, hydrogen fluoride, one or more solvents, or any combination thereof.

Embodiment 41

The microelectronics facility of any one of embodiments 39 and 40, wherein the wick comprises a material adapted to wick at least one of sulfuric acid, peroxide, hydrogen chloride, hydrogen fluoride, one or more solvents, or any combination thereof.

Embodiment 42

The microelectronics facility of any one of embodiments 39-41, wherein the wick comprises a material adapted to transport sulfuric acid, peroxide, hydrogen chloride, hydrogen fluoride, and one or more solvents.

Embodiment 43

The microelectronics facility of any one of embodiments 39-42, wherein the wick is single ply.

Embodiment 44

The microelectronics facility of any one of embodiments 39-43, wherein the wick comprises a flexible sheet of material.

Embodiment 45

The microelectronics facility of any one of embodiments 39-44, wherein the wick is coupled to the lower conduit by an adhesive.

Embodiment 46

The microelectronics facility of embodiment 45, wherein the adhesive comprises a pressure sensitive adhesive.

Embodiment 47

The microelectronics facility of any one of embodiments 45 and 46, wherein the wick and adhesive comprise a laminated structure.

Embodiment 48

The microelectronics facility of any one of embodiments 39-47, wherein the wick is adapted to transport leaked fluid from the lower fluid conduit in a direction toward the sensor, and wherein the sensor is disposable at any relative angle with respect to the wick.

Embodiment 49

A method of detecting leakage from a fluid conduit comprising:
wrapping a wick around substantially an entire circumference of a vertically oriented fluid conduit;
adhering the wick to the fluid conduit by an adhesive associated with the wick; and
attaching a leak detection sensor to the wick.

Embodiment 50

The method of embodiment 49, wherein wrapping the wick is performed one revolution around the circumference of the fluid conduit.

Embodiment 51

The method of any one of embodiments 49 and 50, further comprising adjusting a length of the wick prior to wrapping the wick around substantially the entire circumference of the fluid conduit.

Embodiment 52

The method of any one of embodiments 49-51, further comprising removing an adhesive backing from the wick prior to wrapping the wick around substantially the entire circumference of the fluid conduit.

Embodiment 53

The method of any one of embodiments 49-52, wherein adhering the wick is performed by pressing the wick into the fluid conduit.

Embodiment 54

The method of any one of embodiments 49-53, wherein adhering the wick occurs at a generally simultaneous time as wrapping the wick around substantially the entire circumference of the fluid conduit.

Embodiment 55

The method of any one of embodiments 49-54, wherein attaching the leak detection sensor to the wick is performed after wrapping the wick around substantially the entire circumference of the fluid conduit.

Embodiment 56

The method of any one of embodiments 49-55, wherein attaching the leak detection sensor to the wick is performed such that the leak detection sensor remains spaced apart from the fluid conduit after attachment is complete.

Embodiment 57

The method of any one of embodiments 49-56, wherein wrapping the wick is performed from a first longitudinal end of the wick in a direction toward a second longitudinal end of the wick.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The invention claimed is:

1. A leak detection system comprising:
an adapter configured to be coupled to a conduit and direct leakage from the conduit to a leakage sensor, wherein the adapter comprises a laminate comprising a first major surface defining an adhesive and a wick in a matrix arrangement adapted to transport leakage to the leakage sensor, wherein the wick defines a plurality of discrete fluid channels located between the adhesive in a grid-like structure, wherein the wick comprises a strip comprising at least one of a hydrophilic material, a cationic polymer material, an anionic polymer material, or a hydrophilic non-ionic material, or any combination thereof coupled with the adhesive.

2. The leak detection system of claim 1, wherein the wick is coupled to adhesive adapted to secure the wick to the conduit.

3. The leak detection system of claim 2, wherein the wick and adhesive are fixedly coupled together.

4. The leak detection system of claim 1, wherein the wick comprises a flexible material.

5. The leak detection system of claim 1, wherein the conduit comprises a vertically oriented pipe.

6. The leak detection system of claim 5, wherein the vertically oriented pipe is joined to a secondary pipe at a junction, and wherein the junction is disposed above an area adapted to receive the wick.

7. The leak detection system of claim 1, wherein the wick comprises:
a hydrophilic cationic polymer,
a natural substance consisting of silica, collagen, pectin, gelatin, starch, guar gum, gum Arabic, locust bean gum, gum karaya, alginic acid, sodium or potassium salt,
a synthetic substance consisting of sodium carboxymethylcellulose (CMC), crosslinked sodium carboxymethylcellulose, crystalline sodium carboxymethyl cellulose, polyvinyl alcohol, polyvinyl pyrollidone, polyethylene glycol, polypropylene glycol, crosslinked dextran, starch-acrylonitrile graft copolymer, starch sodium polyacrylate, gluten, polymer of methyl vinyl ether, maleic acid, metal or ammonium salts of polyacrylic acid or its copolymers, metal or ammonium salts of polystyrene sulfonic acid, or
any combination thereof.

8. The leak detection system of claim 1, wherein the conduit adapted to receive the wick has a circumference, $C_c$, and wherein a length of the wick is within a range of 1.0 $C_c$ and 5.0 $C_c$.

9. The leak detection system of claim 1, wherein the wick is single ply.

10. The leak detection system of claim 1, wherein the wick is adapted to be coupled with a sensor adapted to detect leaked fluid from the conduit.

11. The leak detection system of claim 1, wherein the second major surface is defined by the adhesive.

12. The leak detection system of claim 1, wherein the wick comprises a strip coupled with the adhesive.

13. The leak detection system of claim 1, wherein the wick comprises a backing.

14. The leak detection system of claim 1, wherein the plurality of discrete fluid channels are in fluid communication.

15. The leak detection system of claim 14, wherein the plurality of discrete fluid channels define a matrix.

16. A leak detection system comprising:
a laminate adapted to transport leaked fluid from a conduit to a leakage sensor,
wherein the laminate comprises:
a wick in a matrix arrangement adapted to transport the leaked fluid to the leakage sensor; and
an adhesive adapted to secure the wick to the conduit, wherein the wick defines a plurality of discrete fluid channels located between adhesive in a grid-like structure, wherein the wick comprises a strip comprising at least one of a hydrophilic material, a cationic polymer material, an anionic polymer material, or a hydrophilic non-ionic material, or any combination thereof coupled with the adhesive.

17. A fluid conduit comprising:
a junction between a first conduit and a second conduit; wherein at least one of the first and second conduits is a vertical conduit; and
a leak detection system comprising:
   a laminate comprising a first major surface defining an adhesive and a wick in a matrix arrangement, wherein the laminate is coupled to at least one of the first and second conduits by adhesive in the form of a laminate; and
   a sensor adapted to detect leakage transported from the junction along the wick, wherein the matrix arrangement is adapted to transport leakage to the leakage sensor, wherein the wick defines a plurality of discrete fluid channels located between the adhesive in a grid-like structure, wherein the wick comprises a strip comprising at least one of a hydrophilic material, a cationic polymer material, an anionic polymer material, or a hydrophilic non-ionic material, or any combination thereof coupled with the adhesive.

18. The fluid conduit of claim 17, wherein the wick is adapted to be removed from the at least one of the first and second conduits.

* * * * *